United States Patent
Hellberg et al.

(10) Patent No.: US 9,415,526 B2
(45) Date of Patent: Aug. 16, 2016

(54) ENVIRONMENTALLY FRIENDLY WOOD TREATMENT PROCESS

(75) Inventors: Marten Hellberg, Stockholm (SE); Anna Ohrn, Stockholm (SE)

(73) Assignee: OrganoWood AB, Taby (SE)

( * ) Notice: Subject to any disclaimer, the term of this patent is extended or adjusted under 35 U.S.C. 154(b) by 94 days.

(21) Appl. No.: 13/989,868

(22) PCT Filed: Nov. 28, 2011

(86) PCT No.: PCT/EP2011/071204
§ 371 (c)(1),
(2), (4) Date: May 28, 2013

(87) PCT Pub. No.: WO2012/072592
PCT Pub. Date: Jun. 7, 2012

(65) Prior Publication Data
US 2013/0244049 A1    Sep. 19, 2013

(30) Foreign Application Priority Data
Nov. 29, 2010    (SE) ..................................... 1051256

(51) Int. Cl.
| | | |
|---|---|---|
| *B05D 3/02* | (2006.01) | |
| *B27K 3/15* | (2006.01) | |
| *C09K 21/02* | (2006.01) | |
| *D21H 21/36* | (2006.01) | |
| *D21C 9/08* | (2006.01) | |
| *C08L 97/02* | (2006.01) | |
| *C08K 3/00* | (2006.01) | |
| *C08K 3/10* | (2006.01) | |
| *C08K 3/24* | (2006.01) | |
| *C08K 5/00* | (2006.01) | |
| *C08K 5/09* | (2006.01) | |
| *C08K 5/092* | (2006.01) | |
| *C08K 5/42* | (2006.01) | |
| *C08L 83/02* | (2006.01) | |
| *D21H 21/34* | (2006.01) | |

(52) U.S. Cl.
CPC . *B27K 3/15* (2013.01); *C08L 97/02* (2013.01); *C09K 21/02* (2013.01); *D21C 9/08* (2013.01); *D21H 21/36* (2013.01); *C08K 3/0016* (2013.01); *C08K 3/10* (2013.01); *C08K 3/24* (2013.01); *C08K 5/0025* (2013.01); *C08K 5/09* (2013.01); *C08K 5/092* (2013.01); *C08K 5/42* (2013.01); *C08L 83/02* (2013.01); *D21H 21/34* (2013.01); *Y10T 428/662* (2015.04)

(58) Field of Classification Search
CPC ....................................................... B27K 3/15
See application file for complete search history.

(56) References Cited

U.S. PATENT DOCUMENTS

| 63,618 | A | 4/1867 | Devlan | |
|---|---|---|---|---|
| 1,900,212 | A | 3/1933 | Watson | |
| 3,974,318 | A | 8/1976 | Lilla | |
| 4,399,195 | A * | 8/1983 | Allen, Sr. ................. | B27K 3/08 252/404 |
| 4,612,050 | A | 9/1986 | Hicks | |
| 5,205,874 | A | 4/1993 | Crews, IV et al. | |
| 6,146,766 | A | 11/2000 | Slimak et al. | |
| 6,235,349 | B1 * | 5/2001 | Grantham et al. ......... | 427/397.8 |
| 7,297,411 | B2 | 11/2007 | Slimak et al. | |
| 2003/0116054 | A1 | 6/2003 | John et al. | |
| 2005/0042377 | A1 | 2/2005 | Slimak et al. | |
| 2005/0129861 | A1 | 6/2005 | Grantham et al. | |

FOREIGN PATENT DOCUMENTS

| JP | 2011-152773 A | 8/2011 |
|---|---|---|
| WO | 2002/078865 A1 | 10/2002 |
| WO | 2009/087262 A1 | 7/2009 |

OTHER PUBLICATIONS

Giudice et al "Fire Resistance of Wood Impregnated with Soluble Alkaline Silicates"; Research Letters in Materials Science, vol. 2007, Article ID34956, p. 1-4.*
Japanese Office Action in corresponding Japanese Application No. 2013-540412 mailed Mar. 18, 2014.
(Continued)

*Primary Examiner* — Nathan Empie
(74) *Attorney, Agent, or Firm* — Renner, Otto, Boisselle & Sklar LLP (57) ABSTRACT

In order to prolong the usage of wood one needs to prevent the growth of rot and fungi. The most common substances used today are not environmentally friendly and they need to be replaced by more environmentally friendly options. Water glass or sodium silicate has been known for a long time having properties which give the wood resistance to rot and fungi and in addition also fire retardant properties. The present invention discloses a method for treatment of wood to improve the flame retardant properties and also the resistance to rot, fungus, mold and insects of a wooden material. The wood treatment method of the invention comprises the steps of providing a wooden material and providing water based formulation which is stable in room temperature or in temperatures ranging from 15-35° C. The water based formulation of the invention consist essentially of an alkali metal silicate, water and an insolubilization agent which is selected from an organic acid, an inorganic acid or an inorganic polyvalent ion, added in an amount lower than the amount of insolubilization agent needed for the formulation to reach the gelling point. Further the wood treatment method includes the steps of applying the water based formulation on the wooden material and drying the wooden material treated with said water based formulation at any given temperature in order to remove excess of water and also curing the dried wooden material at an elevated temperature in order to insolubilize the alkali metal silicate.

15 Claims, 7 Drawing Sheets

(56) References Cited

OTHER PUBLICATIONS

International Search Report and Written Opinion for corresponding International Application No. PCT/EP2011/071204 mailed Apr. 23, 2012.

Mai et al., "Modificationof wood siwth silicon comounds, inorganic silicon compounds and sol gel systems: a review", Wood Science Technology, vol. 37, pp. 339-348 (cited in specification on p. 1) (copy to be provided).

Furuno et al., "Combinations of wood and silicate Part 6. Biological resistance of wood-mineral composites using water glass-boron compound systems", Wood Science Technology, vol. 23, pp. 161-170 (cited in specification on p. 2) (copy to be provided).

Mai et al., "Modification of wood siwth silicon comounds, inorganic silicon compounds and sol gel systems: a review", Wood Science Technology, vol. 37, pp. 339-348 (cited in specification on p. 1) (cited in information Disclosure Statement filed on May 28, 2013, copy now provided).

Furuno et al., "Combinations of wood and silicate Part 6. Biological resistance of wood-mineral composites using water glass-boron compound systems", Wood Science Technology, vol. 23, pp. 161-170 (cited in specification on p. 2) (cited in Information Disclosure Statement filed on May 28, 2013, copy now provided).

Patent Examination Report No. 1 in corresponding Australian Application No. 2011335109 dated Dec. 17, 2014.

\* cited by examiner

ENVIRONMENTALLY FRIENDLY WOOD TREATMENT PROCESS

This application is a national phase of International Application No. PCT/EP2011/071204 filed Nov. 28, 2011 and published in the English language, which claims priority to SE 1051256-4 filed Nov. 29, 2010.

FIELD OF THE INVENTION

This invention relates to an environmentally friendly wood treatment process.

BACKGROUND

Background to the Invention and Prior Art

Wooden products are widely used in a number of applications including buildings and furniture. Being a renewable resource a broader use of wood in the construction of buildings and for other applications are highly desirable. However, a major problem when using wooden materials in construction and for out-door applications is their inherent biodegradability and their poor resistance to fire. In order to prevent degradation of wood by rot, fungus and insects and/or make it more resistant to fire, the wooden industry are treating wood with different chemicals. Traditionally, various biocides and pesticides such as copper base salts (e.g. copper chrome arsenates (CCA)), borate salts, coal-tar creosote and the like are being used as wood preservatives. In the same manner, various fire retardants commonly used today are based on brominated compounds or phosphate salts. However, all these compounds may if they leach out from the wood have a negative impact on the environment.

For this reason new means of protecting wood have been attracting researchers' attention during the last decades. Silicon is one of nature's most common elements and being an inherently environmentally friendly substance it has gained favor in many applications. Treatment of wood with alkali metal silicates has for this reason been widely studied. The fire retardant properties of wood treated with alkali metal silicates have been known since the 19$^{th}$ century (see e.g. U.S. Pat. No. 63,618). During the last two decades, several studies have also investigated the alkali metal silicates properties as a wood preservative to fungal attacks (for a review see Mai C. and H. Militz. (2004) Modification of wood with silicon compounds, inorganic silicon compounds and sol gel systems: a review. Wood Sci Technol 37:339-348). However, a major problem when using alkali metal silicates as a wood preservative has been their water solubility. In particular sodium silicate (commonly known as water glass), is highly soluble in water. When subjected to out-door conditions such as rain, or being placed in water, the sodium silicate is being dissolved and leaches out from the treated wood.

Recent studies in the field have therefore focused on solving the leaching problem. A mean to make sodium silicate insoluble has been to polymerize monomers of sodium silicate to long polymeric chains. This reaction easily takes place when solutions of sodium silicate are acidified. Several methods have been developed where wood is first treated with sodium silicate and thereafter subjected to an acidic solution (see e.g. Furuno T. and Y. Imamura. (1998). Combinations of wood and silicate Part 6. Biological resistance of wood-mineral composites using water glass-boron compound systems. Wood Sci Technol 23:161-170; U.S. Pat. Nos. 1,900,212; 4,612,050; 5,205,874). Another way has been to promote complex formation between sodium silicate monomers and polyvalent ions. In particular, salts of boric acid, aluminum, calcium, and magnesium have been used. Similar two step approaches as with acidic solutions have been employed, in which wooden materials are first subjected to the silicate solution followed by treatment of a solution containing the complex binder (see e.g. U.S. Pat. No. 3,974,318; US 2005/0129861 A1).

However, even though the properties of sodium silicate as a wood preservative have been known for a long time, a wider acceptance by the industry has not been achieved. A major cause is the high cost involved in multi-step applications. In large scale industrial applications such as vacuum-pressure impregnation of wood, the cost of the process must be kept at a minimum. The two step process described above is therefore a difficult and uneconomic way as the wood need to dry in between the two steps which is costly.

Some studies have been performed in order to solve this problem. E.g. U.S. Pat. No. 7,297,411 describes a method in which wooden material is treated with sodium silicate followed by drying the wood in an elevated temperature in order to make the sodium silicate insoluble. However, when using this method very high temperatures are needed (>200° C.) in order to make all sodium silicate insoluble which makes the method costly and energy consuming. International patent application WO 02/078865 describes a method in which boric acid and sodium silicate are mixed in one solution. According to the invention the amount of boric acid added to the sodium silicate is adjusted to a level in which the formulation has a long shelf life (does not gel or precipitate) but starts to polymerize when the treated wood is dried.

However, boric acid is a biocide and thus harmful to the ecosystem. Therefore, using non-toxic organic acids as (e.g. citric acid, tartaric acid, etc) in order to insolubilize the alkali metal silicate would be a much more environmentally friendly solution. According to U.S. Pat. No. 4,612,050 sodium silicate, citric acid and clay are mixed in a single solution. The amount of citric acid added to the sodium silicate has been adjusted to an amount which keeps the formulation in a condition described as an incipient jelling condition. When the solution is applied on wood a part of the sodium silicate polymerizes and thus becomes insoluble. However, even though some of the sodium silicate in the treated wood becomes insoluble after treatment with this solution a large part of the sodium silicate is still soluble and may leach out when exposed to water.

As described herein, there exists a number of ways to deal with the technical problem with water solubility of alkali metal silicates. However, an industrially feasible, completely environmentally friendly method to use sodium silicate as a wood preservative is still lacking. There is still a need for an industrial method using a wood preservative comprising sodium silicate which gives the wooden material good resistance to water and also a method wherein the wood preservative does not leach out from the treated wood.

OBJECT OF THE INVENTION

The invention relates to a new environmentally friendly, industrially feasible method for treatment of wood and wooden material treated with the method.

In particular the invention relates to a wood treatment method which is industrially feasible, and completely environmentally friendly wherein the wood preservative does not leach out from the treated wood.

Wood treated with the method according to the invention is characterized in also having termite-, fungal- and fire resistant properties.

SUMMARY OF THE INVENTION

The present invention discloses a method for treatment of wood to improve the flame retardant properties and also the resistance to rot, fungus, mold and insects of the wooden material. The wood treatment method of the invention comprises the steps of;
  a) providing a wooden material and providing a water based formulation which is stable in room temperature or in temperatures ranging from 15-35° C.; and
  b) providing a water based formulation of the invention which consist essentially of an alkali metal silicate, water and an insolubilization agent which is selected from an organic acid, an inorganic acid or an inorganic polyvalent ion, added in an amount lower than the amount of insolubilization agent needed for the formulation to reach the gelling point; and
  c) applying the water based formulation on the wooden material; and
  d) drying the wooden material treated with said water based formulation at any given temperature in order to remove excess of water; and
  e) curing the dried wooden material at an elevated temperature in order to insolubilize the alkali metal silicate.

In another embodiment the present invention discloses a method for treatment of wood to improve the flame retardant properties and also the resistance to rot, fungus, mold and insects of the wooden material. The wood treatment method of the invention comprises the steps of;

Pressure impregnation method for treatment of wooden materials to improve the flame retardant properties and also the resistance to rot, fungus, mold and insects of the wooden material, wherein a wooden material is treated with a water based formulation, comprising the steps:
  a) Providing a wooden material, placing the wooden material inside a vacuum-pressure impregnation vessel
  b) Providing a water based formulation which is stable in room temperature or in temperatures ranging from 15-35° C., and consisting essentially of;
    an alkali metal silicate
    water
    an insolubilization agent which is selected from an organic acid, an inorganic acid or an inorganic polyvalent ion, added in an amount lower than the amount of insolubilization agent needed for the formulation to reach the gelling point; and
  c) Applying the water based formulation on the wooden material by adding said water based formulation to the pressure impregnation vessel; and
  d) Subjecting said impregnation vessel and content to more than 90% of vacuum for in between 10-40 minutes.
  e) Subjecting said impregnation vessel and content with pressure of in between 6-16 bars for 20 minutes to 12 hours
  f) Subjecting said impregnation vessel and content to more than 90% of vacuum for in between 10-40 minutes.
  g) Drying the wooden material treated with said water based formulation at any given temperature in order to remove excess of water; and
  h) Curing the dried wooden material at an elevated temperature in order to insolubilize the alkali metal silicate.

Further Embodiments

Embodiments of the invention further comprise optional combinations of the following:

A wood treatment method wherein the weight % of alkali metal silicate compared to the total weight % of the water based formulation can be from 1% w/w to 50% w/w, more preferably from 5% w/w to 30% w/w and most preferably from 10% w/w to 20% w/w.

A wood treatment method wherein the molar ratio between alkali metal, for example sodium or potassium and silicate ($M^+:SiO_4^{4-}$) in the water based formulation will be in the range from 0, 1:1 to 2:1, more preferably from 0.5:1 to 0.8:1, or most preferably a molar ratio of 0.6:1 (which corresponds to a weight ratio of 3.22 between $SiO2$ and $Na2O$).

A wood treatment method wherein the insolubilization agent is an organic acid with a molecular weight of for example between 40-500 g/mol or between 40-300 g/mol.

A wood treatment method wherein the insolubilization agent is an organic acid selected from acetic acid, mandelic acid, citric acid, tartaric acid, aspartic acid, glutamic acid, formic acid, propionic acid, butanoic acid, pentanoic acid, oxalic acid, maleic acid, succinic acid or glutaric acid, methanesulfonic acid (or mesylic acid, $CH_3SO_3H$), ethanesulfonic acid (or esylic acid, $CH_3CH_2SO_3H$), benzenesulfonic acid (or besylic acid, $C_6H_5SO_3H$), p-toluenesulfonic acid (or tosylic acid, $CH_3C_6H_4SO_3H$) or trifluoromethanesulfonic acid (or triflic acid, $CF_3SO_3H$).

A wood treatment method wherein the insolubilization agent is an inorganic acid, for example a mineral acid selected from any of hydrogen halides: hydrochloric acid (HCl), hydrobromic acid (HBr), hydroiodic acid (HI) or the halogen oxoacids: hypochloric acid, chloric acid, perchloric acid, periodic acid and corresponding compounds for bromine and iodine, or from any of sulfuric acid ($H2SO4$), fluorosulfuric acid, nitric acid ($HNO3$), phosphoric acid ($H3PO4$), fluoroantimonic acid, fluoroboric acid, hexafluorophosphoric acid, chromic acid ($H2CrO4$) or boric acid ($H3BO3$).

A wood treatment method wherein the insolubilization agent is an inorganic polyvalent ion selected from $Al^{3+}$, $Mg^{2+}$, $Fe^{2+}$, $Fe^{3+}$, $Ca^{2+}$, $Ba^{2+}$, or with counter ions $CaCl_2$, $MgCl_2$, $FeCl_2$ or combinations thereof.

A wood treatment method wherein the wooden materials is selected from spruce, pine, birch, oak, redwood, cedar or composite materials such as plywood, fibre boards, particle boards, or pulp based materials such as paperboard, corrugated board, gypsum grade paperboard, specialty paper or moulded pulp products. A wood treatment method wherein the insolubilization agent is an organic acid and the alkali metal silicate is sodium silicate.

A wood treatment method wherein the insolubilization agent is an organic acid and wherein suitable molar ratios between the organic acid and sodium silicate may be from 1:18 to 1:100.

A wood treatment method wherein the insolubilization agent is an organic acid wherein suitable molar ratios between the organic acid and sodium silicate may be from 1:18 to 1:100 and wherein the sodium silicate has a molar ratio of $Na^+$ to $SiO_4^{4-}$ of 0, 6:1 and wherein said formulation has a pH above 11.

A wood treatment method wherein the amount insolubilization agent used is at least 10 weight % lower than the amount of insolubilization agent needed for the water based formulation to reach the gelling point.

A wood treatment method wherein the amount of insolubilization agent used in the water based formulation is chosen or adjusted depending on the acidity the wooden material to be treated; higher acidity in the wooden material requires lower amount of insolubilization agent in the formulation.

A wood treatment method wherein the wooden material, after the drying step, has a dryness of 70% or more before entering the curing step in the wood treatment process.

A wood treatment method wherein a stable formulation is a formulation which has a shelf life of more than 1 month in room temperature or lower or in temperatures ranging from 15-35° C.

A wood treatment method wherein the drying step is performed in room temperature or lower or in slightly elevated temperature such as 15-70° C., especially at 20-50° C.

A wood treatment method wherein the curing step is performed at a temperature of 40° C. or more or between 50° C. and 250° C. or in the range of 70° C. to 120° C. or in the range of 75° C. to 100° C.

A wood treatment method wherein the curing step is performed during 10-60 minutes.

A wood treatment method wherein the water based formulation on the wooden material is applied by soaking or dipping the wood into the formulation, spraying, painting or brushing wooden surfaces with the formulation or impregnating the wooden material with the formulation by using vacuum and/or pressure according to normal vacuum-pressure impregnation protocols.

A wood treatment method wherein the water based formulation further comprises a wetting agent in concentration between 0.05% to 5% (w/w) and/or a rheology modifier in concentration 0.05% to 5% (w/w).

A wooden material with improved flame retardant properties and also improved resistance to rot, fungus, mold and insects treated with the method of the invention.

A method according to the invention wherein the water based formulation has a higher viscosity than water.

A method according to the invention wherein the said impregnation vessel and content are subjected to a pressure less than 0.1 atm.

DETAILED DESCRIPTION OF THE INVENTION

Introduction

The invention relates to a new environmentally friendly method for treatment of wooden material and wooden material treated with the method. In particular the invention relates to a wood treatment method in which a water based formulation, containing an alkali metal silicate and an insolubilization agent are employed in order to treat wooden material with a one-pot formulation.

The wood treatment method for treatment of wooden material wherein a wooden material is treated with a water based formulation to improve the flame retardant properties and also the resistance to rot, fungus, mold and insects of the wooden material, is comprising the steps of providing a wooden material and then providing a water based formulation with a long shelf life consisting essentially of; an alkali metal silicate, water and an insolubilization agent (selected from an organic acid, inorganic acid or an inorganic polyvalent ion). To ensure that the water based formulation has a long shelf life and is stable (does not gel or precipitate) during transportation, storage and handling within the factory, the insolubilization agent is added in an amount lower than the amount of insolubilization agent needed to initiate gelling of the alkali metal silicate in the water based formulation. This point is called the gelling point.

Optionally the water based formulation of the invention may comprise a wetting agent and/or a rheology modifier.

The water based formulation of the invention is applied on the wooden material by soaking or dipping the wooden material into the formulation, or by spraying, painting or brushing wooden surfaces with the formulation or by impregnating the wooden material with the formulation by using vacuum and/or pressure according to normal vacuum-pressure impregnation protocols; followed by drying of the treated wooden material in any given temperature in order to remove excess of water, followed by a last step comprising curing of the treated wooden material in an elevated temperature in order to insolubilize the alkali metal silicate within or on the surface of the treated wooden material.

Wooden materials treated with the method according to the invention are characterized in having termite-, fungal-, mold- and fire resistant properties. The alkali metal silicate in the wood treatment composition will to a high degree be insoluble to water after it has been applied on the wooden material by using the wood treatment method of the invention, and will thus not easily leach out from the wood. The wood treatment method of the invention gives the wood durable termite-, fungal- and fire resistant properties even though the treated wooden material is used outdoors or in humid environments. The water resistance of the alkali metal silicates, applied on the wooden materials according to the method of the invention, is sufficiently high, in other words the leaching of the alkali metal silicates from the wooden material is sufficiently low, so that the wooden materials keeps its termite-, fungal- and fire resistant properties although the treated wooden material is subjected to water or used out-doors. Wooden materials treated by using the method of the invention will be resistant to decay by rot fungus and termite attacks. The wooden materials will also be resistant to fire and have anti-mold properties.

The leaching of alkali metal silicates from the treated wooden material is calculated by measuring the amount of alkali metal silicate that is removed when the wood is subjected to water. This is done experimentally by weighing the treated wooden material before treatment, after treatment and after the treated wooden material has been stored in a water bath. The following formula is used for the calculation (wherein W=weight):

$$\text{Unleached alkali metal silicate}(\%) = [(W_{wood\ after\ leaching} - W_{wood\ before\ treatment}) / (W_{wood\ after\ treatment} - W_{wood\ before\ treatment})] \cdot 100$$

$W_{after\ treatment}$=dry weight of the wooden material treated with method of the invention $W_{after\ leaching}$=dry weight of the wooden material treated with the method of the invention after it has been subjected to the leaching procedure described above $W_{before\ treatment}$=dry weight of the wooden material before it has been treated with the method of the invention Unleached alkali metal silicate (%)=the amount alkali metal silicate (%) that remains in the treated wooden material after it has been subjected to the leaching procedure.

The percentage of unleached alkali metal silicate is always wanted as high as possible. High percentage values of unleached alkali metal silicate mean that the alkali metal silicate remains in the treated wooden material. It is desired that more than 70% of the alkali metal silicates stay in the wooden material (percentage of unleached alkali metal silicate is over 70%) after it has been subjected to water.

The water based formulation used in the method of the invention is normally composed of an alkali metal silicate and an insolubilization agent that can enhance the alkali metal silicate to polymerize or by other means become insoluble, once applied on the wooden material. The insolubilization agent contributes to make the alkali metal silicate insoluble and resistant to water. Examples of suitable alkali metal silicates are sodium silicate and potassium silicate. Examples of insolubilization agents are organic acids, inorganic acids and inorganic polyvalent ions.

The following detailed description of the invention and the corresponding examples will explain the method of the invention and its corresponding materials Detailed Description Of The Process Providing a Wooden Material Suitable wooden materials may be, but are not limited to solid wood such as spruce, pine, birch, oak, redwood, cedar and others; or composite materials such as plywood, fibre boards, particle boards or other composites. According to the invention, materials derived from wood such as pulp based materials e.g. paperboard, corrugated board, gypsum grade paperboard, specialty paper, for example filter paper or printing paper, moulded pulp products, or other pulp based materials are also defined as a wooden material and can also be treated with the formulation.

The Water Based Formulation

The wood treatment method according to the invention includes a premade water based formulation or composition made by mixing an alkali metal silicate, water and an insolubilization agent to a homogenous water based solution. The water based formulation may optionally also contain a wetting agent and a rheology modifier. The ratio of insolubilization agent to alkali metal silicate in the composition can only be in a narrow specific range, and the amount of insolubilization agent added to the solution shall be lower than the amount needed for initiation of gelling of the alkali metal silicate. The amount insolubilization agent has to be enough for enhancing gel formation of the alkali metal silicate after the wooden material has been treated with the solution but not as much as to start the gel forming process before the water based formulation is applied on the wooden material. By carefully selecting the ratio between the insolubilization agent and the alkali metal silicate a formulation with long shelf life can be obtained which becomes insoluble upon treatment of wooden materials followed by drying and curing of the wood.

The Alkali Metal Silicates

The weight % of alkali metal silicate of the total weight % of the water based formulation can be from 1% w/w to 50% w/w, more preferably from 10% w/w to 40% w/w and most preferably from 10% w/w to 25% w/w. Examples of suitable alkali metal silicates are potassium silicate and sodium silicate. Due to economical aspects sodium silicate is the preferred choice in the formulation.

Sodium silicate with the general formula $XNa^+SiO_4^{4-}$ is the preferred choice of alkali metal silicate according to the invention. Sodium silicate is made by reacting $Na_2O$ with $SiO_2$ in order to form $XNa^+SiO_4^{4-}$. The molar ratio between sodium and silicate ($Na^+:SiO_4^{4-}$) may vary in any given molar ratio but preferably will be in the range from 0, 1:1 to 2:1, more preferably from 0.5:1 to 0.8:1, or most preferably a molar ratio of 0.6:1 (which corresponds to a weight ratio of 3.22 between SiO2 and Na2O). All molar ratios mentioned herein have a high water solubility which is important in order to keep a low viscosity of the formulation for an effective impregnation of the wood.

The same molar ratios as mentioned above may be applied to potassium silicates. The molar ratio between potassium and silicate ($XK^+:SiO_4^{4-}$) may vary in any given molar ratio but preferably will be in the range from 0.1:1 to 2:1, or more preferably from 0.5:1 to 0.8:1.

In general terms the molar ratio between alkali metal ($XM^+$) and silicate ($SiO_4^{4-}$) in the water based formulation according to the invention may vary in any given molar ratio but preferably will be in the range from 0.1:1 to 2:1.

The Insolubilizing Agents

By insolubilizing agents is meant substances that can enhance polymerization or complex formation of alkali metal silicates.

Insolubilization agents suitable for the invention are all substances that can enhance polymerization or gelling of alkali metal silicates or by any other means make it insoluble in water such as by facilitating complex formation of alkali metal silicate monomers. Polymerization or gelling of alkali metal silicates occurs when the pH is reduced below a certain level by the addition of an acid or an acidic compound to a water based solution containing alkali metal silicates, or by adding an inorganic polyvalent ion that can facilitate complex formation of the alkali metal silicate monomers.

Examples of insolubilization agents are organic acids, inorganic acids or inorganic polyvalent ions.

The organic acids used as insolubilization agents according to the invention are for example organic acids with low molecular weight or with a molecular weight of for example 40-500 g/mol or 40-300 g/mol. The organic acids are for example selected from any of the carboxylic acids; acetic acid, mandelic acid, citric acid, aspartic acid, glutamic acid, tartaric acid, formic acid, propionic acid, butanoic acid, pentanoic acid, oxalic acid, maleic acid, succinic acid or glutaric acid or combinations thereof. The organic acids can also be selected from any of low molecular weight sulfonic acids, for example selected from (or mesylic acid, $CH_3SO_3H$), ethanesulfonic acid (or esylic acid, $CH_3CH_2SO_3H$), benzenesulfonic acid (or besylic acid, $C_6H_5SO_3H$), p-Toluenesulfonic acid (or tosylic acid, $CH_3C_6H_4SO_3H$) or trifluoromethanesulfonic acid (or triflic acid, $CF_3SO_3H$).

The inorganic acids used as insolubilization agents according to the invention are for example mineral acids, such as mineral acids selected from any of hydrogen halides and their solutions, e.g. hydrochloric acid (HCl), hydrobromic acid (HBr), hydroiodic acid (HI) or the halogen oxoacids, e.g. hypochloric acid, chloric acid, perchloric acid, periodic acid and corresponding compounds for bromine and iodine, or from any of sulfuric acid (H2SO4), fluorosulfuric acid, nitric acid (HNO3), phosphoric acid (H3PO4), fluoroantimonic acid, fluoroboric acid, hexafluorophosphoric acid, chromic acid (H2CrO4) or boric acid (H3BO3), or combinations thereof.

To insolubilize alkali metal silicates by using complex formation one can also employ inorganic polyvalent ions such as $Cl^{2+}$, $Mg^{2+}$, $Fe^{2+}$, $Fe^{3+}$, $Ca^{2+}$, $Ba^{2+}$, or with counter ions $CaCl_2$, $MgCl_2$, $FeCl_2$. The concentration of the catalyst in the formulation varies with regard to the concentration of the alkali metal silicate and the efficiency of the insolubilization agent. If an acid is used as an insolubilization agent the pKa of the acid is essential for the amount needed. When acids are employed, the acidity of the wooden material itself also needs to be considered as the acids within the wood will add to the total acidic content of the formulation when it has been applied to the wood.

The most preferred insolubilization agents according to the invention are non-toxic organic acids due to environmental reasons and they being an economic alternative when used in industrial scale. Alkali metal silicates in water solutions will start gelling at a certain point. The gelling point and the non-gelling range of a water based formulation may be measured or controlled by controlling the pH of the formulation or by controlling the molar ratio of the insolubilization agent to the alkali metal silicate. It is important that the correct interval of the molar ratio of the insolubilization agent to the alkali metal silicate or the pH is controlled in order to keep the formulation from gelling before applying the formulation onto the wooden material. For example, if a sodium silicate with a molar ratio of $Na^+$ to $SiO_4^{4-}$ of 0.6:1 is used, the pH of the formulation shall not be below 11 if a long shelf life of the formulation is desired.

Suitable molar ratios between an organic acid and sodium silicate may be from e.g. 1:18 to 1:100 depending on the acidity of the treated wooden substrate and the pKa of the organic acid.

In order to keep a long shelf life of the water based formulation, the pH must not drop below a certain point, otherwise the formulation will form a gel or precipitate if stored over a longer period of time. If the alkali metal silicate starts gelling before applied to the wood it will not penetrate the solid wooden material. The molar ratio between the insolubilization agent and the alkali metal silicate also needs to be in a specific range as to insolubilize the alkali metal silicate when the water based formulation is dried and cured under elevated temperature. If the amount of insolubilization agent is too low, the alkali metal silicate formulation will not become insoluble after it has been applied to the wood and cured.

Depending on the insolubilization agent employed and its mode of action (acid or polyvalent ion), the wooden material treated also needs to be considered. Some wood species have a higher degree of inherent acidity than other due to rosin acids and other extractive substances produced by the wood. Other has higher degree of ions such as $Ca^{2+}$ or $Mg^{2+}$. The various degrees of inherent substances need to be taken into account when deciding the proper molar ratio between the insolubilization agent and the alkali metal silicate.

If for example the same degree of acid is employed when treating a wooden material with more inherent acidity than a wooden material with less acidity, the alkali metal silicate may start gelling at the surface of the wooden material as the local pH at the surface becomes too low. This will limit the amount of alkali metal silicate that can penetrate the wooden material and thus the efficiency of the formulation in terms of the wooden materials flame retardant and anti-fungal properties.

To decide upon a proper molar ratio between the insolubilization agent and the alkali metal silicate some simple experiments can be performed. The highest concentration of insolubilization agent to akali metal silicate can e.g. be determined by adding insolubilization agent to a water based formulation of alkali metal silicate until the alkali metal silicate starts gelling. By adding approximately 10% less insolubilization agent than the gelling concentration, it will result in a formulation which has a long shelf life and will become insoluble when dried and cured. When wooden material is treated with the formulation and cured, normally a higher degree of alkali metal silicate becomes insoluble than when the solution containing alkali metal silicate and insolubilization agent is dried outside the wood. Without being bound by theory, a reason may be that the inherent acidity and/or concentration of polyvalent ions in the wooden material aid in the insolubilization process by increasing the total concentration of insolubilization agent in relation to the alkali metal silicate, thus increasing the amount of alkali metal silicate that is insolubilized.

The preferred choice of insolubilization agent is non-toxic organic acids but other acids can also be employed.

According to one embodiment of the invention a water based formulation with long shelf life is a formulation containing sodium silicate with a molar ratio of $Na^+$ to $SiO_4^{4-}$ of 0.6:1 with a pH above 11. A formulation containing the same alkali metal silicate will start gelling if the pH is kept below 11.

A formulation with long shelf life is a formulation which can be stored for a certain time in room temperature or lower or in temperatures ranging from 15-35° C. In one embodiment of the invention a formulation with long shelf life is a formulation which can be stored in room temperature or lower or in temperatures ranging from 15-35° C. for at least one month or more. In other embodiments a formulation with a long shelf life is a formulation which can be stored for at least 2 months or more. It is important that the water based formulation according to the invention has a long shelf life and is storable because it is intended to be used in a modern industrial process according to the process or method of the invention.

The Wetting Agent and/or a Rheology Modifier.

The addition of a wetting agent (or surfactants) and/or a rheology modifier to the water based formulation according to the invention are optional.

A wetting agent or surfactant may be added to the water based formulation according to the invention to lower the surface tension. This may be important in order for the formulation to penetrate into the wooden material more readily, thus enhance the effect of the treatment. Different types of wetting agents are for example substances which are polar and have a hydrophobic tail and formally charged groups in its head, for examples of different surfactants see surfactants mentioned in Surfactants and Interfacial Phenomena, 3rd Edition. A non-ionic surfactant has no charge groups in its head. Suitable concentrations of the wetting agent in the water based formulation of the invention may be for example in between 0.05% to 5% (w/w).

A rheology modifier may be added to the water based formulation according to the invention in order to increase the viscosity of the formulation and thereby, for example, make the water based formulation according to the invention more easy to apply on the wooden material using for example different brushing or coating techniques. Different types of rheology modifiers are for example starches and its derivatives, or cellulose derivatives such as carboxymethyl cellulose. Suitable concentrations of the rheology modifier in the water based formulation of the invention may be for example in between 0.5% to 5% (w/w).

Application Method of the Water Based Formulation on the Wooden Material

The water based formulation is applied on the wooden material by any of the currently used industrial processes such as by soaking or dipping the wooden material into the formulation, spraying, painting or brushing wooden surfaces with the formulation or impregnate the wooden material with the formulation by using vacuum and/or pressure according to normal vacuum-pressure impregnation protocols.

The Drying Step

When the wooden material has been treated with any of the above mentioned application methods it needs to be dried to remove excess water from the wooden material. The drying process may occur at any given temperature but a slightly elevated temperature is preferred.

When drying the wooden material it is of importance to ensure that sufficient drying is achieved before entering the next step (the curing step) in the wood treatment process. By ensuring that the wooden material is dry (70-90% dryness) before entering the curing step we have discovered that the wood has to be cured for only a short time period, as short as 1 minute and still get improved properties in regards of low leaching.

The method according to the invention is therefore more environmentally friendly than any known wood treatment methods since the heating used during the wood treatment can be reduced to a minimum and still the alkali metal silicates will not leach out readily from the treated wooden material The drying step is in one embodiment of the invention performed in room temperature or even in slightly elevated temperatures, such as in 15-70° C. or 15-60° C. or 15-50° C. or especially 20-50° C.

The drying of the wood is easily monitored with standardized equipment for measuring the dryness of wood. Before the curing step, the wood shall have a dryness of at least 70% or more, preferably 80% or more or most preferably 85% or more. The time for curing in elevated temperatures is shorter if the drying is complete before entering the curing step.

According to the method of the invention the dryness of the wooden material shall be 70% dryness or more, for example from 70-100% dryness, or for example from 80-100% dryness before curing the wooden material.

The temperature of the drying step is preferably in between 10° C. to 100° C., or even more preferably 25° C. to 70° C. or especially 40° C. to 60° C. Normal drying equipment for wooden materials can be used in order to promote drying of the wooden material.

The Curing Step

When a certain amount of water has evaporated from the wood during the drying step, the treated wooden material according to the invention needs to be cured in an elevated temperature for a certain amount of time in order to let the alkali metal silicate react to form polymers or complexes, which makes the alkali metal silicate insoluble in water. In one embodiment of the invention the treated wooden material is cured in a temperature of 40° C. or more, preferably in 60° C. or more. In a more preferred embodiment of the invention the wood is cured in the range of 60° C. to 150° C., and in an even more preferred embodiment the wood is cured in the range of 70° C. to 120° C. In the most preferred embodiment of the invention the wood is cured in the range of 75° C. to 100° C. and this interval is chosen due to its industrial applicability and due to the fact that the alkali metal silicate gets its desired leaching properties using this temperature interval. Depending on the curing temperature, the time sufficient to insolubilize the alkali metal silicate will vary. Higher curing temperatures need shorter curing times and lower curing temperatures need longer curing times. If curing temperatures above 150° C. are used, caution must be taken as not to create discoloration of the wood due to pyrolysis of the fibres. The curing times can also vary depending on the molar ratio of insolubilization agent to alkali metal salt in the formulation. A molar ratio closer to the gelling point will need shorter curing time while a higher molar ratio correspondingly will need a longer curing time.

In the most preferred embodiment the wooden material shall be cured at 70-90° C. for 10-60 minutes, depending on the thickness of the wooden material. However, different curing times will be needed depending on the wood species and the formulation employed. Determination of the optimal curing time can easily be done by performing a few simple experiments by a person skilled in the art.

Wooden Material Treated with the Method According to the Invention

According to the invention a wooden material treated with said method is also provided. The wooden material can be any kind including solid wood such as fir, pine, birch, oak, redwood, cedar and others; or composite materials such as plywood, fibre boards, particle boards or other composites. According to the invention, wooden material can also be material based on wood pulp such as paperboard, corrugated board, gypsum grade paperboard, specialty paper, moulded pulp products, or other pulp based materials. The wooden material is characterized in having flame resistant properties and/or anti-fungal properties, such as resistance to rot fungus and/or mold. In addition the wooden materials have better resistance to wood eating insects such as termites, ants and borers. The surface of the wooden material will also harden by the process which is useful in some applications.

Example of a Preferred Method According to the Invention:

A preferred application method of the invention is vacuum-pressure-vacuum impregnation. In this method, the wooden material is placed inside a vacuum-pressure-impregnation vessel. The vessel is thereafter filled with the water based formulation and thereafter subjected to vacuum more than 90% vacuum for in between 10-40 minutes, followed by pressure of in between 6-16 bars for 20 minutes to 12 hours, followed by more than 90% vacuum for 10-40 minutes. The variation in time and pressure depends on the wood material used, and how much water based formulation that shall penetrate the wooden material. The amount of penetration of the water based formulation into the wooden material is important for the effect that is achieved. A greater penetration will give a higher effect regarding flame retardancy and fungal protection".

The formulation of this invention has a viscosity higher than water which makes the penetration of the wooden material more difficult compared to when impregnation liquids with lower or similar viscosity as water is used. In order to obtain the highest degree of effect in flame retardancy and rot protection a high penetration of the impregnation into the wooden material is necessary. The most effective production process in order to obtain an effective penetration of the formulation according to the invention into the wooden material is a vacuum-pressure-vacuum impregnation method.

The said impregnation vessel may be subjected to a pressure less than 0.1 atm, for example between 0.1-0 atm.

The water based formulation according to the invention preferably has a higher viscosity than water.

More embodiments of the invention will be apparent by the corresponding examples.

Experimental Part

Example of Production of a Water Based Formulation According to the Invention

Example of production of 1000 g boric acid/sodium silicate solution. To 588.14 g cold water 19.76 g of boric acid is added during mixing. The solution is mixed for 10 min to ensure that all boric acid is dissolved. To a container 392.10 g of sodium silicate is added. During mixing the boric acid solution is added at a rate of ca 200 g/min. The finished formulation is stirred for another 10 min to ensure that the formulation is homogenous. pH is measured to 11.1. The finished product is poured into a plastic container for storage.

Other Considerations when Producing the Water Based Formulations According to the Invention Sodium silicate formulations with organic acids or inorganic acids as insolubilizing agents are prepared in a similar manner as described above. The amount of insolubilizing agent is adjusted in order to obtain a water based formulation with long shelf life which is stable during storage and thus is not near its gelling point which is around pH 10.6 for formulation with containing sodium silicate with a molar ratio of 0.6:1.

The desired amount of insolubilization agent used in the water based formulations of the invention may be tested by first making a solution by adding the insolubilization agent to a silicate solution until its gelling point is reached. In order to make new storable, stable water based formulation with long shelf life according to the invention, the amount of added insolubilization agent shall be sufficiently lower than the amount insolubilization agent needed to reach the gelling point. For example the amount of insolubilization agent used according to the invention is 10 weight % less or more than the amount of insolubilization agent needed for the water based formulation to reach the gelling point.

This method of calculation of the amount of insolubilization agent may be used for all possible insolubilization agents which may be used according to the invention. Another way to measure the amount of insolubilizing agent needed when using an acid as insolubilization agent is that the pH of the water based formulation is sufficiently high compared to the pH of the gelling point. The pH of the gelling point will vary between different formulations of the invention depending on which alkali metal silicate is used, e.g. a pH of a formulation according to the invention with long shelf life and thus, which is stable during storage, may be 11 or higher and the pH for the gelling point when using the same alkali metal silicate (containing larger amount insolubilization agent) may be around 10.6.

General Method for Redissolution Test for Determining Leaching.

Examples 1-2, 4 and 9 in which the leaching properties were investigated by simulation of leaching, using a redissolution test according to the following principle:

Formulations according to the inventions were prepared in a plastic container. Thereafter the formulations (still in the plastic container) were dried and cured in an oven at various temperatures. The dried and cured formulations were weighed and added to a beaker with a magnetic stirrer. 200 ml of boiling hot water was added to the beaker and the formulations were redissolved, under continuous stirring, for 3 minutes. After 3 minutes the beaker content was vacuum filtrated using a filter paper and a Buchner funnel. The undissolved amount of alkali metal silicate was calculated according to:

Remaining product after redissolution(%)=100−
$[(W_{after\ curing} - W_{after\ redissolution})/W_{after\ curing}] \cdot 100$ General Method for Determining Leaching.

Examples 3 and 5-6 in which the leaching properties were investigated where tested according to the following principle:

Formulations according to the inventions were prepared. Thereafter the formulations where applied on a wooden material. The treated wooden material was dried and cured in an oven at various temperatures and times. The dried and cured treated wooden materials were weighed and added to a beaker. The treated wooden material where leached in individual containers using distilled water, changed every day. After 1 week the leached specimens were weighed and reconditioned until constant weight was reached. The weight loss during leaching could then be calculated according to:

Remaining formulation in pine specimens after
leaching(%)=$[(W_{formulation\ after\ curing} - W_{formulation\ after\ leaching})W_{formulation\ after\ curing}] \cdot 100$ wherein $W_{formulation\ after\ curing} = W_{dry\ specimen\ after\ curing} - W_{dry\ specimen\ before\ treatment}$ $W_{formulation\ after\ leaching} = W_{dry\ specimen\ after\ leaching} - W_{dry\ specimen\ before\ treatment}$

EXAMPLES

The purposes of the following examples are to demonstrate the solubility of the sodium silicate that has been subjected to the method of the invention, leaching of sodium silicate which has been impregnated into wooden materials, and flame- and rot resistance of wooden materials which have been subjected to the method of the invention.

Example 1

Various Insolubilization Agents Giving Improved Leaching Properties

Effect on the solubility of sodium silicate using formulations of the invention containing various insolubilization agents, in the example illustrated by a mineral acid; boric acid, and an inorganic polyvalent ion; calcium chloride.

| Raw material | Formulation 1 (w/w %) | Formulation 2 (w/w %) | Formulation 3 (w/w %) |
| --- | --- | --- | --- |
| Sodium Silicate, molar ratio 0.6:1, dry content 37.5% | 39.2 | 39.9 | 40.0 |
| Water | 58.9 | 59.8 | 60.0 |
| Boric Acid | 1.9 | — | — |
| Calcium chloride | — | 0.3 | — |

Formulations were prepared by first mixing the insolubilization agent and water and then slowly adding, under continuous stirring, the dissolved insolubilization agent mix to the sodium silicate.

20.0 grams of formulations 1, 2 and 3 were added to single use containers with large surface area to dry at 50° C. over night. When dry, said formulations were cured at 20° C. and 190° C. for 30 minutes.

Figure 1:
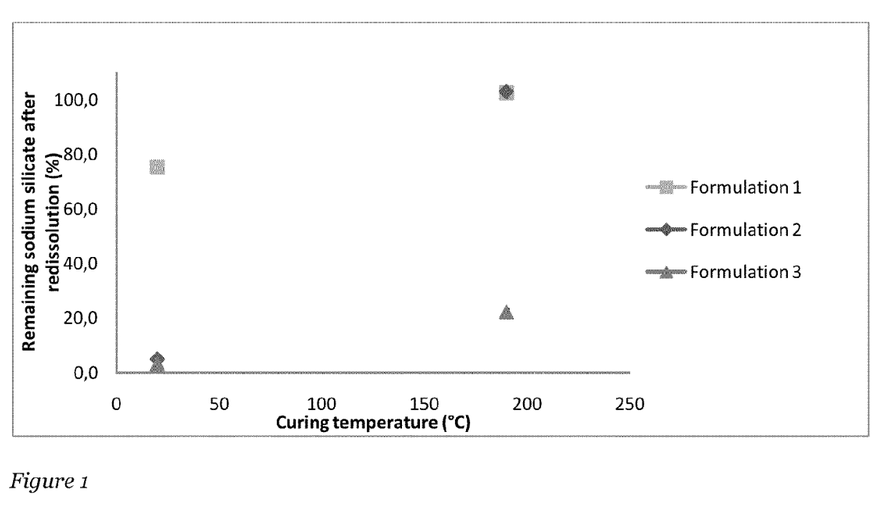
FIG. 1 shows a diagram illustrating the curing temperature and remaining product after redissolution for various inorganic or multivalent ion insolubilization agents.

The results are shown in FIG. 1.

Example 2

Effect of the Concentration of the Formulation

Effect on solubility of sodium silicate using formulations of the invention with varying dry contents of formulation.

| Raw material | Formulation 4 (w/w %) | Formulation 4 - diluted (w/w %) | Formulation 5 (w/w %) | Formulation 5 - diluted (w/w %) |
|---|---|---|---|---|
| Sodium Silicate, molar ratio 0.6:1, dry content 37.5% | 60.00 | 12.0 | 60.0 | 12.0 |
| Water | 37.6 | 87.5 | 40.0 | 88.0 |
| Citric acid (monohydrate) | 2.4 | 0.5 | — | — |

Formulations were prepared by first mixing the insolubilization agent and water and then slowly adding, under continuous stirring, the dissolved insolubilization agent mix to the sodium silicate.

20.0 grams of formulation 4 and 5 and versions diluted with water of said formulations were added to single use containers with large surface area to dry at 50° C. over night. When dry, said formulations were cured at 100° C. for 30 minutes.

All samples were then subjected to a redissolution test according to the general method described above.

Figure 2:
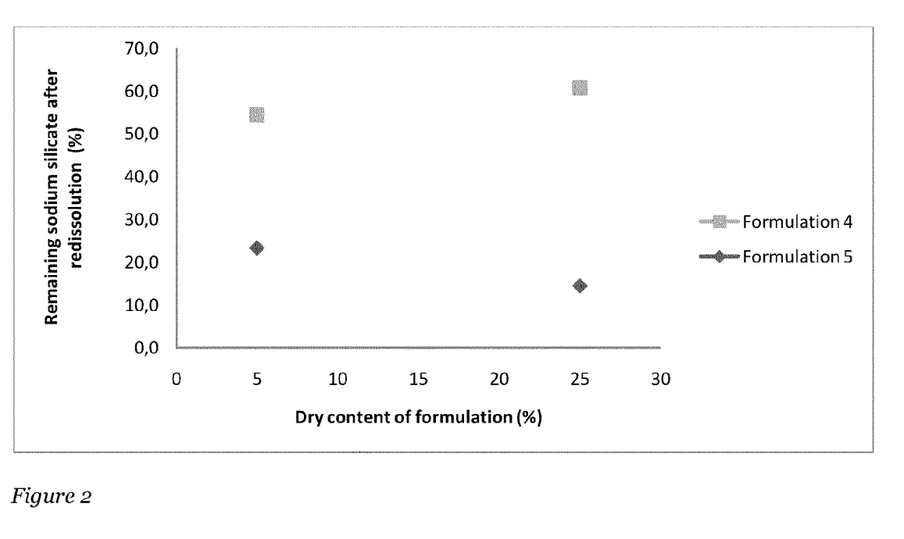
FIG. 2 shows a diagram illustrating the concentration and remaining product after redissolution.

The results are shown in FIG. 2.

The dry content of the diluted formulations in FIG. 2 corresponds to the weight percentage silicate and insolubilization agent in the water solution.

Example 3

Leaching of Sodium Silicate from Impregnated Paper Materials

Effect on leaching of sodium silicate using paper specimens impregnated with different formulations of the invention.

| Raw material | Formulation 13 (w/w %) | Formulation 14 (w/w %) |
|---|---|---|
| Sodium Silicate, molar ratio 0.6:1, dry content 37.5% | 53.3 | 53.3 |
| Water | 46.7 | 44.5 |
| Citric acid (monohydrate) | — | 2.2 |

Specimens of filter paper of diameter 185 mm were impregnated by soaking for 10 seconds.

Impregnated specimens were dried in room temperature over night. Curing was carried out for 10 minutes at 100° C.

Specimens were leached in individual containers using 300 ml of 90° C. water by keeping the paper material in the water for 10 minutes. After drying the paper the weight loss during leaching was calculated according to:

Remaining formulation after leaching(%)=100−
$[(W_{paper\ after\ leaching} - W_{untreated\ paper})/$
$(W_{paper\ before\ leaching} - W_{untreated\ paper})] \cdot 100$ The results from the leaching process show an increased resistance to leaching when insolubilization agent (citric acid) is added to the formulation.

Figure 3:
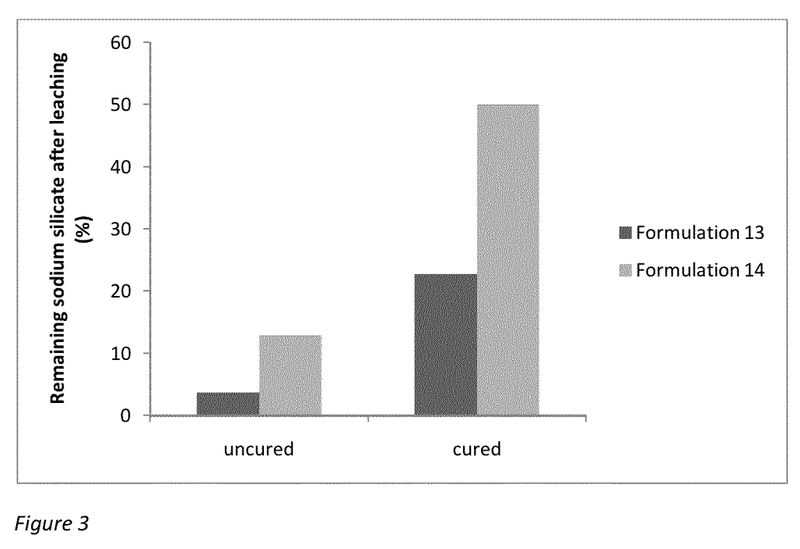
FIG. 3 shows a diagram illustrating the effect of curing on leaching.

The results are shown in FIG. 3.

Example 4

Curing Temperature

Effect on solubility of sodium silicate when using formulations of the invention with varying curing temperatures.

| Raw material | Formulation 3 (w/w %) | Formulation 6 (w/w %) |
|---|---|---|
| Sodium Silicate, molar ratio 0.6:1, dry content 37.5% | 40.0 | 40.0 |
| Water | 60.0 | 58.4 |
| Citric acid (monohydrate) | — | 1.6 |

Formulations were prepared by first mixing the insolubilization agent (citric acid) and water and then slowly adding, under continuous stirring, the dissolved insolubilization agent mix to the sodium silicate.

20.0 grams of formulations 3 and 6 was added to single use containers with large surface area to dry in room temperature until dry. When dry, the containers with said formulations were cured for 30 minutes at 20° C., 70° C. and 190° C.

All samples were then subjected to a redissolution test according to the general principle.

Figure 4:
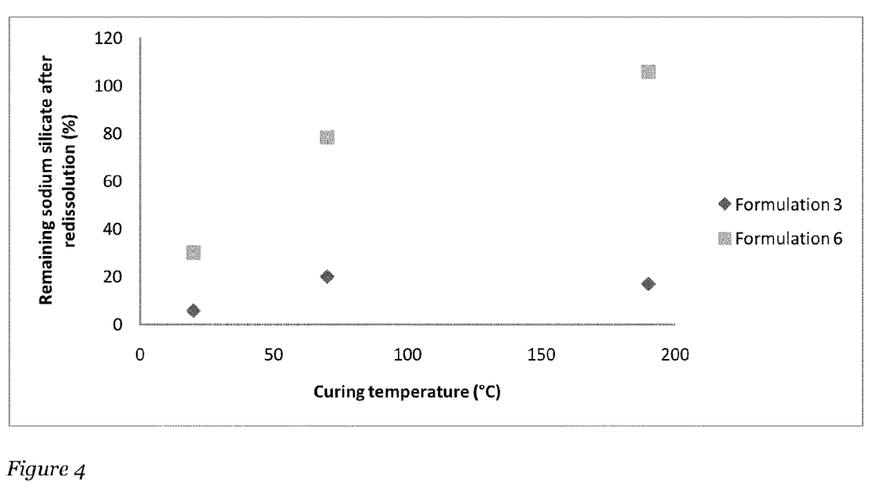
FIG. 4 shows a diagram illustrating the curing temperature and remaining product after redissolution.

The results are shown in FIG. 4

Example 5

Leaching of Sodium Silicate Impregnated Pine Specimens

The effect on leaching of sodium silicate using pine specimens impregnated with different formulations of the invention and varying curing temperatures.

| Raw material | Formulation 7 (w/w %) |
|---|---|
| Sodium Silicate, molar ratio 0.6:1, dry content 37.5% | 40.0 |
| Water | 59.0 |
| Citric acid (monohydrate) | 1.0 |

Specimens of pine sapwood, size 0.8 cm×1.5 cm×7 cm, were impregnated under vacuum for 20 minutes followed by 20 minutes of soaking at atmospheric pressure using formulation 3, 6 and 7.

Impregnated specimens were dried over night in 50° C. and cured for 30 min at 20° C., 70° C., 110° C., 150° C. and 190° C.

Specimens were leached in individual containers using 75 ml of distilled water, changed every day. pH was measured throughout the leaching process. After 1 week the leached specimens were weighed and reconditioned at 50° C. until constant weight was reached. The weight loss during leaching could then be calculated according to:

Remaining formulation in pine specimens after leaching(%)=100−[$W_{formulation\ after\ curing}$−$W_{formulation\ after\ leaching}$)/$W_{formulation\ after\ curing}$]·100 where $W_{formulation\ after\ curing}$=$W_{dry\ specimen\ after\ curing}$−$W_{dry\ specimen\ before\ treatment}$ $W_{formulation\ after\ leaching}$=$W_{dry\ specimen\ after\ leaching}$−$W_{dry\ specimen\ before\ treatment}$ The results from the leaching process show an increased resistance to leaching when insolubilization agent (citric acid) is added to the formulation.

Figure 5:
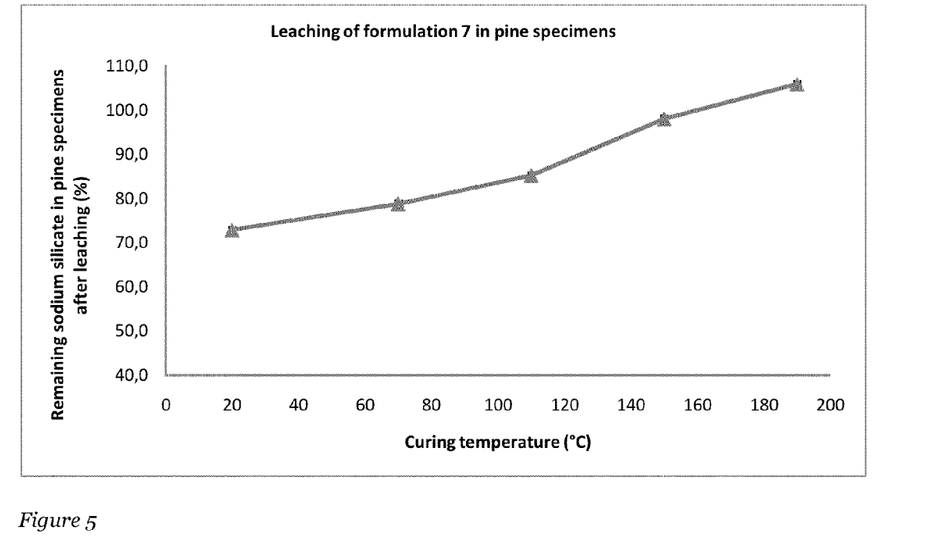
FIG. 5 shows a diagram illustrating the curing temperature and leaching.

The results are shown in FIG. 5

Example 6

Leaching of Sodium Silicate Impregnated Pine Specimens

| Raw material | Formulation 3 (w/w %) | Formulation 6 (w/w %) | Formulation 7 (w/w %) |
|---|---|---|---|
| Sodium Silicate, molar ratio 0.6:1, dry content 37.5% | 40.0 | 40.0 | 40.0 |
| Water | 60.0 | 58.4 | 59.0 |
| Citric acid (monohydrate) | — | 1.6 | 1.0 |

Specimens of pine sapwood, size 0.8 cm×1.5 cm×7 cm, were impregnated under vacuum for 20 minutes followed by 20 minutes of soaking at atmospheric pressure using formulation 3, 6 and 7.

Impregnated specimens were dried over night in 50° C. and cured for 30 min at 70° C.

Specimens were leached in individual containers using 75 ml of distilled water, changed every day. pH was measured throughout the leaching process. After 1 week the leached specimens were weighed and reconditioned at 50° C. until constant weight was reached. The weight loss during leaching could then be calculated according to:

Remaining formulation in pine specimens after leaching(%)=100−[($W_{formulation\ after\ curing}$−$W_{formulation\ after\ leaching}$)/$W_{formulation\ after\ curing}$]·100 where $W_{formulation\ after\ curing}$=$W_{dry\ specimen\ after\ curing}$−$W_{dry\ specimen\ before\ treatment}$ $W_{formulation\ after\ leaching}$=$W_{dry\ specimen\ after\ leaching}$−$W_{dry\ specimen\ before\ treatment}$ The results from the leaching process show an increased resistance to leaching when the insolubilization agent (citric acid) is added to the formulation. Higher amount of the insolubilization agent gives better leaching resistance.

Figure 6:
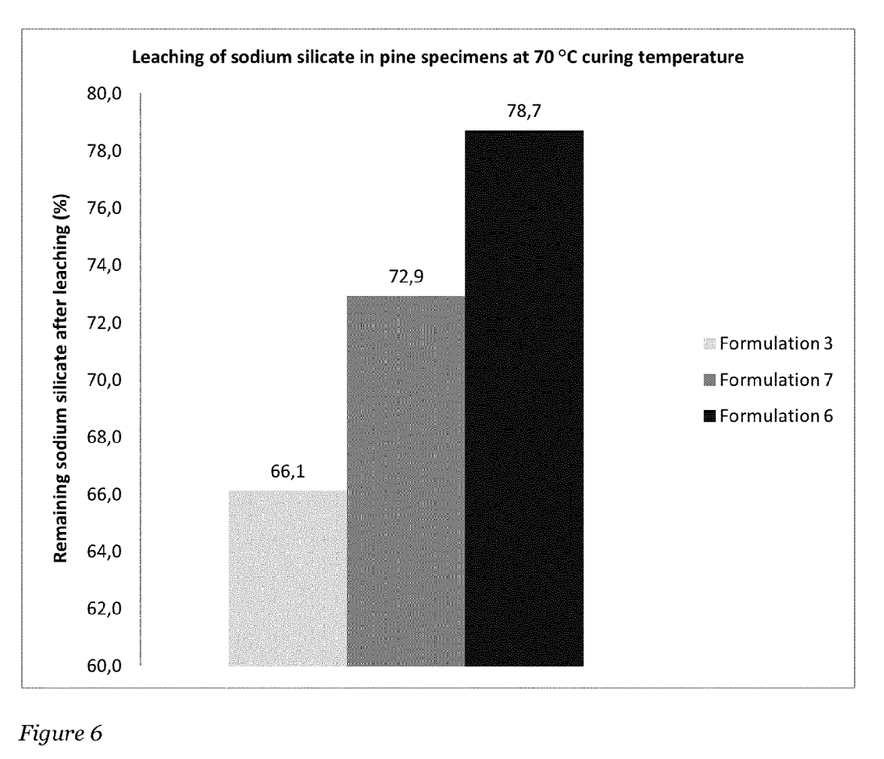
FIG. 6 shows a diagram illustrating the curing temperature and leaching for different formulations.

The results are shown in FIG. 6

Example 7

Reaction to Fire

Effect of the flame resistance of wood treated with the method of the invention was evaluated by using a standardized ISO-test (ISO 5660). In the test, the treated wooden materials reaction-to-fire, heat release, smoke production and mass loss rate were measured. In the experiment, the following formulations were used in order to treat the wooden materials.

| Raw material | Formulation 3 (w/w %) | Formulation 6 (w/w %) | Formulation 8 (w/w %) | Formulation 9 (w/w %) |
|---|---|---|---|---|
| Sodium Silicate, molar ratio 0.6:1, dry content 37.5% | 40.0 | 40.0 | 24.3 | 61.2 |
| Water | 60.0 | 58.4 | 74.9 | 36.7 |
| Citric acid (monohydrate) | — | 1.6 | — | — |
| Boric acid | — | — | 0.8 | 2.1 |

Fibre boards were impregnated according to the following procedure; 40 minutes vacuum 95% and 40 minutes pressure at 8 bar. Fibre boards were then dried at 23° C., 50% RH until they reached equilibrium.

| Test parameter | Formulation 3 | Formulation 6 | Formulation 8 | Formulation 9 |
|---|---|---|---|---|
| FIGRA (W/s) | 204 | 185 | 197 | 93 |
| $t_{ign}$(s) | 53 | 61 | 59 | 75 |
| Total mass loss (g/m$^2$) | 3022 | 1717 | — | 2029 |
| Total smoke production (m$^2$/m$^2$) | 39 | 39 | 36 | 45 |
| Indicated class | C | C | C | B |

The results show improvement from indicated class D to indicated class C when fibre-board was impregnated with formulations 3, 6 and 8 and improvement from indicated class D to indicated class B when fibre-board was impregnated with formulation 9.

Example 8

Rot Resistance

Effect of the rot resistance ability of formulations of the invention was evaluated according to the following procedure, "EN113-Test method for determining the protective effectiveness against wood destroying basidiomycetes".

| Raw material | Formulation 10 (w/w %) |
| --- | --- |
| Sodium Silicate, molar ratio 0.6:1, dry content 37.5% | 40.0 |
| Water | 58.7 |
| Boric acid | 1.3 |

Pine sap wood treated with Formulation 10 was approved according to the standard.

Example 9

Leaching of a Potassium Silicate Formulation

Effect on solubility of potassium silicate using formulations of the invention with varying curing temperatures.

| Raw material | Formulation 11 (w/w %) | Formulation 12 (w/w %) |
| --- | --- | --- |
| Potassium Silicate, weight ratio 2.1 (SiO2 to K2O), dry content 36.7% | 40.9 | 40.9 |
| Water | 57.6 | 59.1 |
| Citric Acid (monohydrate) | 1.5 | — |

Formulations were prepared by first mixing the insolubilization agent and water and then slowly adding, under continuous stirring, the dissolved insolubilization agent mix to the potassium silicate.

20.0 grams of formulations 11 and 12 were added to single use containers with large surface area to dry at 50° C. over night. When dry, said formulations were cured at 20 and 190° C. for minutes.

All samples were then subjected to a redissolution test according to the general principle described above.

Figure 7:
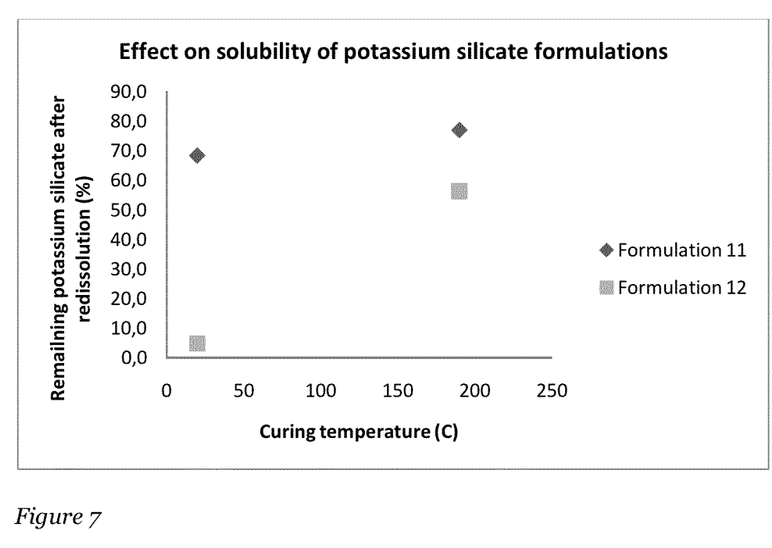
FIG. 7 shows the effect on remaining product after redissolution of potassium silicate formulations according to the invention with varying curing temperatures.

The results are shown in FIG. 7

The invention claimed is:

1. Method for treatment of wooden materials to improve the flame retardant properties and also the resistance to rot, fungus, mold and insects of the wooden material, wherein a wooden material is treated with a water based formulation, the method comprising the steps:
   a) providing a wooden material;
   b) providing a water based formulation which has a shelf life of more than 1 month in temperatures ranging from 15-35° C., and containing;
      an alkali metal silicate;
      water; and
      an insolubilization agent which is selected from an organic acid, an inorganic acid or an inorganic polyvalent ion selected from $Al^{3+}$, $Mg^{2+}$, $Fe^{2+}$, $Fe^{3+}$, $Ca^{2+}$, $Ba^{2+}$, or with counter ions $CaCl_2$, $MgCl_2$, $FeCl_2$ or combinations thereof, added in an amount which is at least 10 weight % lower than the amount to insolubilization agent needed for the formulation to reach the gelling point; and wherein the weight % of alkali metal silicate compared to the total weight % of the water based formulation is from 1% w/w to 50% w/w; and
   c) applying the water based formulation on the wooden material by impregnating the wooden material with the formulation by using vacuum and/or pressure;
   d) drying the wooden material treated with said water based formulation at any given temperature in order to remove excess of water; and
   e) curing the dried wooden material at a temperature between 70° to 120° C. in order to insolubilize the alkali metal silicate, wherein the curing step is performed during 10-60 minutes.

2. A method according to claim 1, wherein the insolubilization agent is an organic acid with a molecular weight of between 40-500 g/mol.

3. A method according to claim 1, wherein the insolubilization agent is an organic acid selected from acetic acid, mandelic acid, citric acid, tartaric acid, aspartic acid, glutamic acid, formic acid, propionic acid, butanoic acid, pentanoic acid, oxalic acid, maleic acid, succinic acid, glutaric acid, methanesulfonic acid ($CH_3SO_3H$), ethanesulfonic acid ($CH_3CH_2SO_3H$), benzenesulfonic acid ($C_6H_5SO_3H$), p-toluenesulfonic acid ($CH_3C_6H_4SO_3H$) or trifluoromethanesulfonic acid ($CF_3SO_3H$).

4. A method according to claim 1, wherein the insolubilization agent is an inorganic acid selected from among hydrochloric acid (HCl), hydrobromic acid (HBr), hydroiodic acid (HI), hypochloric acid, chloric acid, perchloric acid, periodic acid and corresponding compounds for bromine and iodine, sulfuric acid ($H_2SO_4$), fluorosulfuric acid, nitric acid ($HNO_3$), phosphoric acid ($H_3PO_4$), fluoroantimonic acid, fluoroboric acid, hexafluorophosphoric acid, chromic acid ($H_2CrO_4$) and boric acid ($H_3BO_3$).

5. A method according to claim 1, wherein the amount of insolubilization agent used in the water based formulation is chosen or adjusted depending on the acidity the wooden material to be treated; wherein higher acidity in the wooden material requires lower amount of insolubilizaiotn agent in the formulation.

6. A method according to claim 1, wherein the wooden material, after the drying step, has a dryness of 70% or more before entering the curing step in the wood treatment process.

7. A method according to claim 1, wherein the dying step is performed at room temperature or lower or at a slightly elevated temperature within the range of 15-70° C.

8. A method according to claim 1, wherein the wooden material is selected from spruce, pine, birch, oak, redwood, cedar, composite materials, and pulp based materials.

9. A method according to claim 1, wherein the water based formulation further comprises a wetting agent in a concentration between 0.05% to 5% (w/w) and/or a rheology modifier in a concentration 0.05% to 5% (w/w).

10. A method according to claim 1, wherein the molar ratio between the alkali metal and silicate ($XM^+$:$SiO_4^{4-}$) in the water based formulation is in the range of from 0.1:1 to 2:1.

11. A method according to claim 10, wherein the alkali metal silicate is sodium silicate.

12. A method according to claim 11 wherein the suitable molar ratios between the organic acid and sodium silicate are in the range of 1:18 to 1:100.

13. A method according to claim 12 wherein the sodium silicate has a molar ratio of $Na^+$ to $SiO_4^{4-}$ of 0.6:1 and wherein said formulation has a pH above 11.

14. Pressure impregnation method for treatment of wooden materials to improve the flame retardant properties and also the resistance to rot, fungus, mold and insects of the wooden material, wherein a wooden material is treated with a water based formulation, the method comprising the steps:
  a) providing a wooden material, placing the wooden material inside a vacuum-pressure impregnation vessel;
  b) providing a water based formulation which has a shelf life of more than 1 month in temperatures ranging from 15-35° C., and consisting essentially of;
    an alkali metal silicate;
    water; and
    an insolubilization agent which is selected from an organic acid, an inorganic acid or an inorganic polyvalent ion, added in an amount which is at least 10 weight % lower than the amount of insolubilization agent needed for the formulation to reach the gelling point; and
  c) applying the water based formulation on the wooden material by adding said water based formulation to the pressure impregnation vessel;
  d) subjecting said impregnation vessel and content to more than 90% vacuum for in between 10-40 minutes;
  e) subjecting said impregnation vessel and content with pressure of in between 6-16 bars for 20 minutes to 12 hours;
  f) subjecting said impregnation vessel and content to more than 90% vacuum for between 10-40 minutes.
  g) drying the wooden material treated with said water based formulation at any given temperature in order to remove excess of water; and
  h) curing the dried wooden material at a temperature between 70° to 120° C. in order to insolubilize the alkali metal silicate, wherein the curing step is performed during 10-60 minutes.

15. A method according to claim 14, wherein the water based formulation has a higher viscosity than water.

* * * * *